United States Patent [19]

Meyer et al.

[11] 4,454,713
[45] Jun. 19, 1984

[54] PULSE WIDTH MODULATED FUEL METERING SYSTEM

[75] Inventors: Gene A. Meyer, West Simsbury; Robert E. Peck, Prospect, both of Conn.

[73] Assignee: Chandler Evans Inc., West Hartford, Conn.

[21] Appl. No.: 270,484

[22] Filed: Jun. 4, 1981

[51] Int. Cl.³ .............................................. F02C 9/28
[52] U.S. Cl. .................................................. 60/39.281
[58] Field of Search ................................... 60/39.28 R

[56] References Cited

U.S. PATENT DOCUMENTS

| 3,006,144 | 10/1961 | Arnett et al. | 60/39.28 R |
| 3,475,908 | 11/1969 | Warne | 60/39.28 R |
| 3,688,495 | 9/1972 | Fehler et al. | 60/39.28 R |
| 4,015,426 | 4/1977 | Hobo et al. | 60/39.28 R |

*Primary Examiner*—Louis J. Casaregola

*Attorney, Agent, or Firm*—Radford W. Luther; Richard A. Dornon

[57] ABSTRACT

A fuel metering system for a gas turbine engine with a low pressure drop fuel vaporizing system includes an engine driven centrifugal pump (10) supplied with fuel at a given absolute pressure (Pi) from a tank. The pump discharges fuel to a rapidly pulsed, solenoid operated ball valve (20) which functions as a metering valve in controlling flow to the engine. The solenoid (38) of the metering valve receives periodic voltage pulses of appropriate width from an electronic control which senses selected engine parameters and computes the required fuel flow and the pressure differential ($P_r - P_D$) across the metering valve. Since the pressure differential across the metering valve increases with engine speed, favorable flow turndown ratios may be achieved without operating the metering valve at high or low values of duty cycle.

2 Claims, 4 Drawing Figures

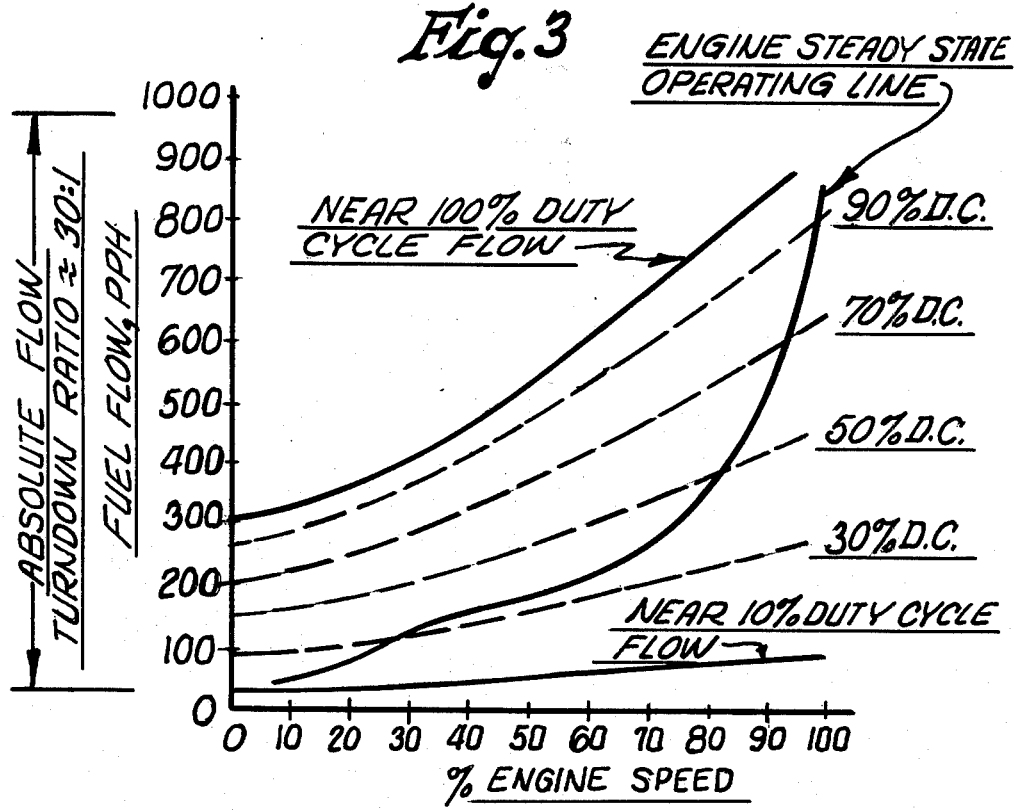
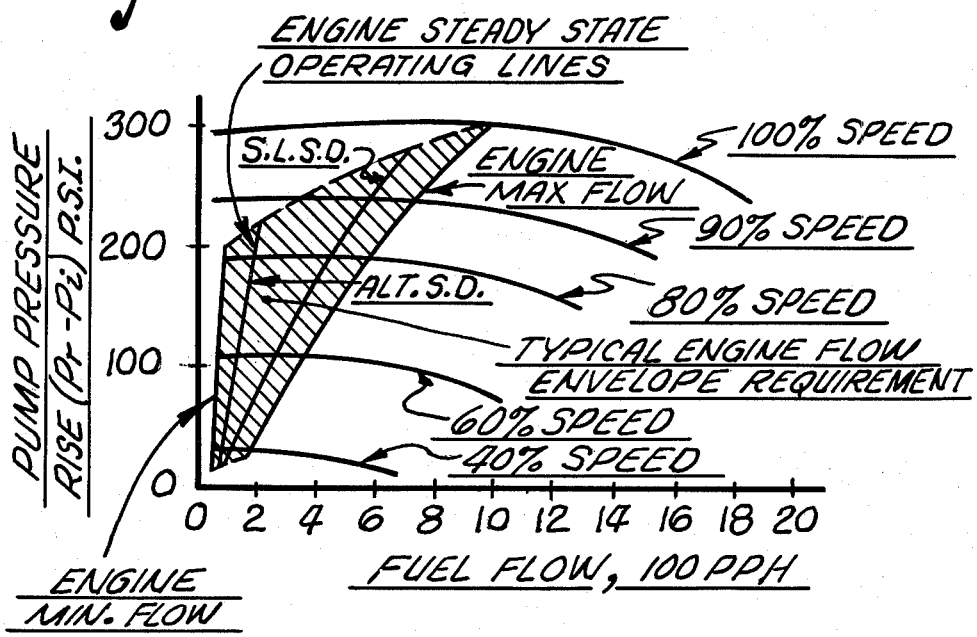

PULSE WIDTH MODULATED FUEL METERING SYSTEM

TECHNICAL FIELD

This invention relates to fuel controls for gas turbine engines.

BACKGROUND ART

Traditional fuel metering systems for gas turbine engines embody a metering valve, a head regulator to maintain a constant differential pressure across the metering valve and a shut-off valve. In order to achieve a minimal cost, the aforementioned components generally operate at low force levels. Operation at low force levels has the drawback of fostering hysteresis owing to contaminants becoming interposed between moving parts and close fits between the parts themselves.

The utilization of high frequency, time modulated ball valves for metering fuel is known in the prior art. Certain fuel metering systems in automobiles employ pulsed solenoids in order to interrupt the flow to the engine in such a manner as to produce a desired flow rate. However, flow stoppages of this nature engender pressure spike fluctuations which affect the proper functioning of upstream elements. In addition, a known gas turbine engine fuel control utilizes a pulsed solenoid to apportion a constant flow of fuel between the engine burner nozzles and a bypass loop. Such a latter mentioned fuel control is described in U.S. patent application Ser. No. 183,059, entitled Fuel Control Method and Apparatus and filed on Sept. 2, 1980 in the names of Robert E. Peck and Raymond D. Zagranski.

DISCLOSURE OF INVENTION

In accordance with the invention, there is provided a fuel metering system of an exceedingly simple character which is capable of scheduling fuel flow on an open or closed loop basis. The system of the invention essentially embodies only two mechanical elements, viz.: an engine driven centrifugal pump and a time modulated, solenoid operated metering valve which receives flow from the pump. The metering valve functions to discharge flow to an engine atomizing slinger or other vaporizing system which begets a negligible pressure drop. An electronic control, which senses a plurality of engine parameters, applies voltage pulses to the solenoid having a pulse width commensurate with the required fuel flow.

A fuel metering system of the invention is advantageous in many respects. For example, close fitting and contaminant sensitive elements operating at low force levels may be omitted from a system of the invention, thereby ameliorating hysteresis problems. Moreover, the inclusion of constant flow regulators or bypass conduits is obviated in a system according to the invention. It is also important to note that because the pressure differential across the metering valve in a metering system of the invention increases with engine speed, favorable flow turndown ratios may be achieved without operating the valve at high or low values of duty cycle (e.g. Below 10% or above 90%) which may be difficult to attain with certain solenoid operated valves. In addition, a fuel metering system of the invention does not require a separate shut-off valve as the fuel metering valve itself may adequately perform the shut-off function. It is also noteworthy that utilization of a centrifugal pump in association with a valve operated in an on-off mode is beneficial because such a pump will act somewhat like a capacitor in smoothing out flow disturbances.

Accordingly, it is a primary object of the invention to provide an uncomplicated fuel metering system for a gas turbine engine which embodies an engine driven centrifugal pump and a time modulated, solenoid operated metering valve.

This and other objects and advantages of the invention will become more readily apparent from the following detailed description when taken in conjunction with the accompanying drawings, in which:

BRIEF DESCRIPTION OF DRAWINGS

FIG. 3 is a graph showing the relationship between engine speed and fuel flow for various duty cycles.

FIG. 4 is a graph showing the relationship between fuel flow and the pressure rise across the pump for various engine speeds.

BEST MODE OF CARRYING OUT THE INVENTION

Figure 1:
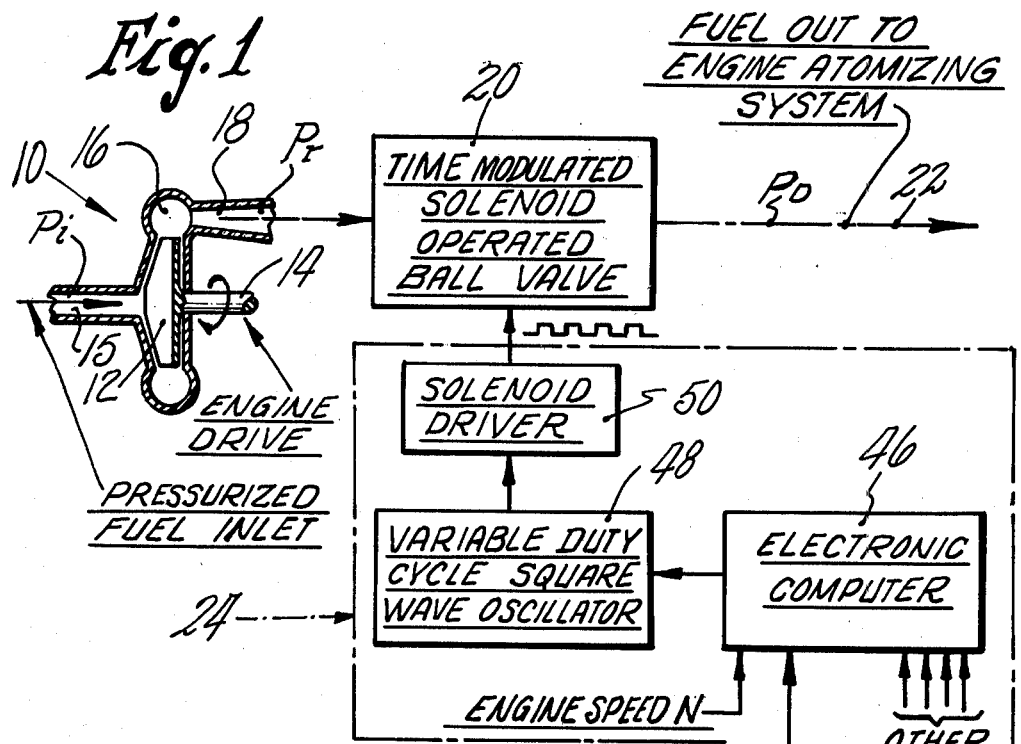
FIG. 1 is a schematic diagram of a fuel metering system according to the invention.

Referring to the drawings and more particularly to FIG. 1, there is shown a preferred embodiment of a fuel metering system of the invention. The fuel metering system incorporates an engine driven centrifugal pump, generally indicated at 10. The pump 10 is a conventional and includes an impeller 12 driven by a drive shaft 14 connected to the engine gear box (not shown). The pump 10 is supplied with a fuel at inlet pressure Pi via a pressurized fuel tank (not shown) and an inlet conduit 15 which discharges fuel into the eye of the impeller 12. Fuel is discharged by the impeller 12 to a collector 16, from where it enters a fuel discharge conduit 18.

Fuel from the discharge conduit 18 is directed to a metering valve in the form of a time modulated, solenoid operated ball valve 20. The ball valve 20 is pulsed many times a second so as to rapidly cycle between open and closed states. When valve 20 is open flow from the discharge conduit 18 traverses the valve and enters a fuel outlet conduit 22 which is connected to the engine atomizing system, such as a slinger. When valve 20 is closed, the flow from the discharge conduit 18 is momentarily deadheaded whereby no flow traverses the valve.

The valve 20 is pulsed by an electronic control, generally designated 24, which senses engine speed and may sense other engine parameters such as compressor discharge pressure. The exact frequency of voltage pulses applied to the solenoid will, of course, be dictated by engine stability considerations but will probably be of the order of between 20 to 100 Hz. The fuel flow entering the engine atomizing system is a non-linear function of the duty cycle (i.e., the ratio of time that current is applied to the solenoid to the period) and the pressure differential or head across the valve. Although pulse width modulation, wherein the pulse frequency is held constant and only the pulse width is varied, is the preferable method of operation, pulse ratio modulation, wherein both pulse width and frequency are variables, is also a suitable method.

Figure 2:
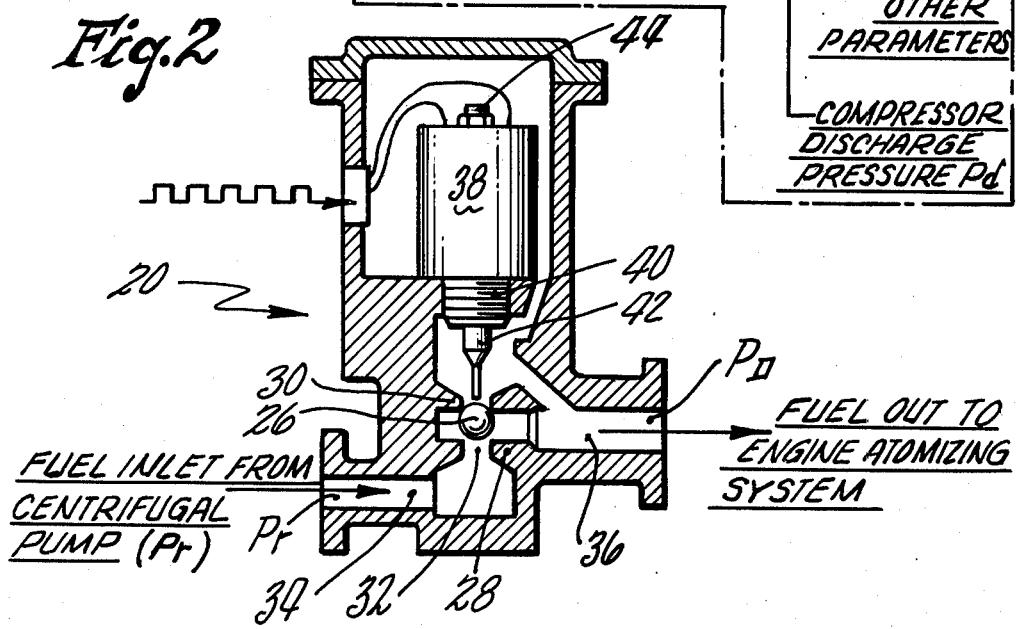
FIG. 2 is a sectional view of an embodiment of a time modulated, solenoid operated ball valve suitable for incorporation in a fuel metering system of the invention.

The time modulated, solenoid operated valve 20, depicted in detail in FIG. 2, comprises a ball element 26 which is rapidly displaced between a first seat 28 and a second seat 30 formed therein. The first valve seat 28 defines an orifice 32 through which flow proceeds when the ball element is in its upper position, seated against the second seat 30. Valve 20 includes an inlet 34 which directs flow to the orifice 32 and an outlet 36 which receives flow from the orifice 32. The inlet 34 of valve 20 is connected to the fuel discharge conduit 18 so as to be supplied with fuel therefrom at a pressure Pr. The outlet 36 of valve 20 discharges fuel to the fuel discharge conduit 22 and is therefore at pressure $P_D$. It should then be readily apparent that flow proceeds through the valve 20 when the ball element 26 is seated against the first seat 30 and that no flow traverses the valve 20 when the ball 26 is seated against seat 28 whereby the flow from the pump 10 is deadheaded. As will be appreciated by those skilled in the art, the ball element 26 in valve 20 is constrained against lateral movement. It will be understood that a pressure balanced valve could replace the ball valve.

The valve 20 incorporates a solenoid 38 which has a threaded lower section 40 which is screwed into the valve housing for fixedly mounting the solenoid in proximate relationship to the ball element 26. The solenoid 38 has a plunger 42, the tip of which lies just above the ball element 26 when the solenoid is energized as is depicted in FIG. 2. The constant upward force on the ball element from the fluid pressure provides an upward bias thereupon. The solenoid 38 is provided with an adjustment set screw 44 to allow for setting the internal spring preload exerted on the plunger 42. When the solenoid 38 is deenergized the preload overrides the forces acting on the ball element 26, thereby causing the ball element 26 to be urged against seat 28.

The heart of the electronic control 24 is an electronic computer 46, which senses various engine parameters such as set and sensed engine speed and compressor discharge pressure and generates an analog control signal representative of a scheduled fuel flow to a variable duty cycle square wave oscillator 48. The variable duty cycle oscillator is a fixed frequency (e.g., 50 Hz) device which generates a square wave voltage form having a certain voltage V for a portion of each cycle and zero voltage for the remaining portion of each cycle. The respective fractions of a cycle during which the output of the oscillator is V and zero are proportional to the magnitude of the signal from the electronic computer 46. The square wave voltage form from the oscillator is applied to a solenoid driver 50 (e.g., a Darlington transistor) which is connected to a solenoid 38 for directing current therethrough. The frequency of the oscillator is selected so as to be compatible with engine operation.

In operation, the control will not commence functioning until pump 10 attains a speed (e.g., 10%) sufficient to deliver the fuel flow required. The pump 10 is, of course, dirven by the engine. The solenoid 38 is cycled by the oscillator 50 in accordance with the control signal generated by the computer 46. The fuel flow from the fuel discharge conduit 18 is periodically deadheaded by the pulsating ball element 26 in such a manner as to deliver the requested fuel flow to the engine.

The operational characteristics and advantages of the fuel metering system of FIG. 1 may be best appreciated by reference to FIGS. 3 and 4. As shown in the example of FIG. 3, because the pressure differential across the valve 20 increases with the engine speed (since the speed of the pump 10 correspondingly increases) a large flow turndown ratio (30:1) may be achieved without operating the valve at duty cycles below 10% or above 90% where modulation could be difficult or impossible. Turndown ratio is, of course, the maximum flow divided by the minimum flow. It will be noted that if the pressure head across valve 20 were maintained at a constant value, the turndown ratio attainable might only be of the order of 10:1, assuming reasonable pulse frequencies (e.g., 60 Hz). It will, of course, also be appreciated that in a fuel metering system of the invention, it will not be necessary to achieve duty cycles approaching 100% although it is within the ambit of the invention.

The pump pressure rise characteristics are presented in the example of FIG. 4 with the engine flow requirement envelope superimposed thereupon. Since the pump 10 is a centrifugal pump, the pressure rise (pr−Pi) occasioned across the pump for a given pump speed varies little with fuel flow. In fact, within the engine operating envelope, the pressure rise may be regarded as being of a constant value for a given pump speed. For example, at 80% pump speed (which occurs, of course at 80% engine speed), the pressure rise may be considered as being a constant 190 psi at all levels of fuel flow, from the maximum flow to the minimum flow. If the pump 10 is charged at a given absolute pressure Pi, then the pressure Pr, which will be equal to the pump inlet pressure Pi plus the pressure rise (Pr−Pi), will be a known function of engine speed and easily calculated in the computer 46. It will be understood that the affect of temperature and altitude on the value of Pi may also be evaluated in any calculations. Hence, for a known engine speed, the pressure Pr, which is the pressure at the inlet of valve 20, may be readily determined in a facile manner. Assuming that a slinger or a nozzle with negligible pressure drop is employed to atomize the fuel directed to the engine combustion chambers, the metering valve 20 would discharge to compressor discharge pressure Pd (which may be directly sensed or synthesized by known methods). Therefore, the pressure at the outlet 36 of metering valve 20 would be the compressor discharge pressure. With the pressure at the valve inlet 34 known and the pressure at the valve outlet 36 known, the pressure differential across valve 20 may be easily ascertained by subtracting the outlet pressure $P_D$ from the inlet pressure Pr. In certain engines, it may be desirable to have the valve 20 discharge flow to compressor inlet pressure or ambient pressure. These latter mentioned pressures may, in like manner, be sensed or synthesized, thereby enabling computation of the pressure head across valve 20.

In general, a conventional solenoid in a system of the invention should yield satisfactory modulation performance in the range of 10% to 90% duty cycle. However, when the duty cycle is below 10%, the valve 20 may shut-off completely; and when the duty cycle is above 90%, the valve 20 may go to full open. Moreover, it is important to note that the duty cycle range in which effective valve modulation is possible is dependent to a large extent on the pressure differential across the valve 20. It has been found that the lower the pressure differential across the valve, the greater the modulation range. It will also be appreciated that it may be possible to extend the duty cycle range below the 10% with the incorporation of a hammer circuit in the solenoid driver so as to increase the initial current flow to the solenoid.

The relationship between fuel flow and duty cycle in a system of the invention for the range of pressure differentials or heads across the valve 20 must be determined experimentally. For a constant pressure differential, the relationship between fuel flow and duty cycle will deviate from the ideal straight line, with the largest deviation occurring at about 50% duty cycle. Such deviations become more pronounced as the pressure head across the valve 20 increases. When the relationships between fuel flow, duty cycle and the pressure head across the valve 20 have been established such information will, of course, be placed in the electronic computer 46. It will be appreciated by those skilled in the art that the computer 46 could take the form of an analog computer or a digital computer (e.g., a microprocessor based microcomputer) and may even be arranged to directly pulse the solenoid 38.

Obviously, many modifications and variations are possible in light of the above teachings without departing from the scope or spirit of the invention as defined in the appended claims.

We claim:

1. In a fuel metering system for a gas turbine engine having a low pressure drop fuel vaporizing system:
    a centrifugal pump in driving connection with the engine such that there is correspondence between the speed of the engine and the speed of the pump;
    an inlet conduit operatively connected to the pump for delivering fuel thereto;
    a discharge conduit operatively connected to the pump for receiving fuel discharged thereby;
    means for supplying the inlet conduit with fuel at a given absolute pressure;
    a metering valve having: an inlet; an orifice which receives flow from the inlet; an outlet which receives flow from the orifice; a rapidly displaceable element adapted to periodically choke the orifice; and a solenoid for rapidly displacing the element between a position in which the orifice is choked and a position in which the orifice is open, the valve inlet being fluidly connected to the discharge conduit and the valve outlet being fluidly connected to the fuel vaporizing system such that when the orifice is choked, the discharge conduit is deadheaded whereby no flow traverses the valve and when the orifice is open, flow traverses the valve and proceeds to the vaporizing system, the pressure differential across the valve increasing as engine speed increases; and
    an electronic control adapted to sense selected engine parameters, compute a required fuel flow, compute the pressure differential across the metering valve and generate voltage pulses having a duty cycle commensurate with the required fuel flow, the electronic control being operatively connected to the solenoid such that the generated voltage pulses are applied thereto.

2. The combination of claim 1, wherein the rapidly displaceable element is constituted by a ball element and wherein the solenoid includes a plunger which displaces the ball element to a position in which the orifice is choked when the solenoid deenergized.

* * * * *